R. E. COLE.
POCKET FLASH LIGHT BATTERY AND BULB TESTER.
APPLICATION FILED JULY 3, 1918.
1,315,816. Patented Sept. 9, 1919.
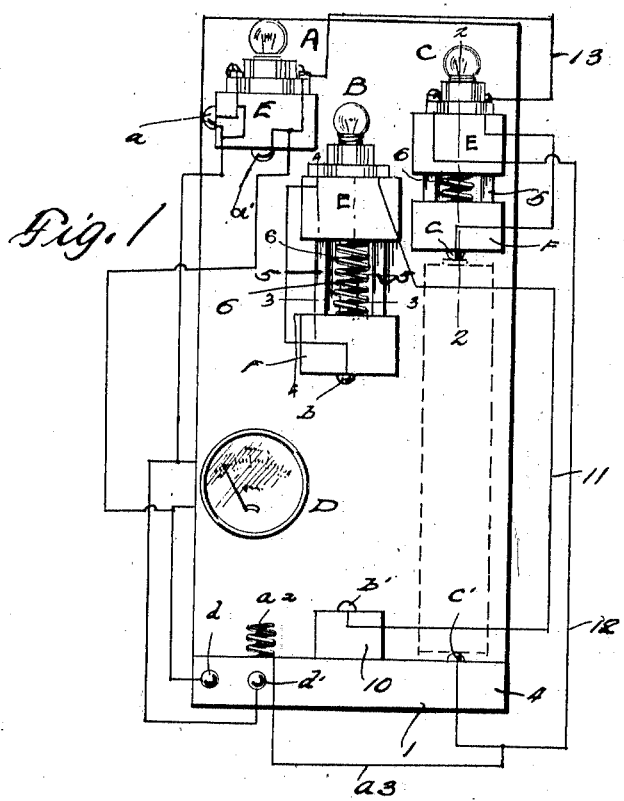
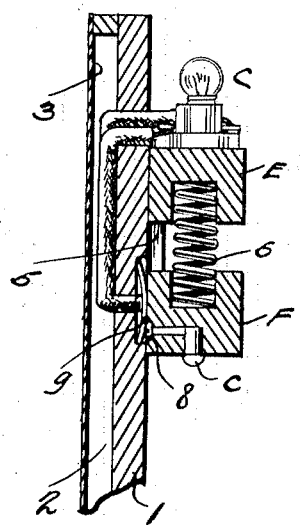
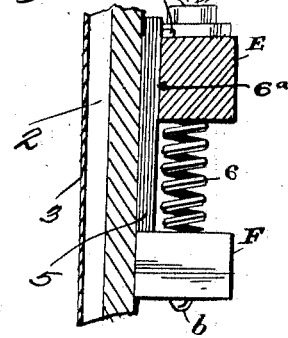
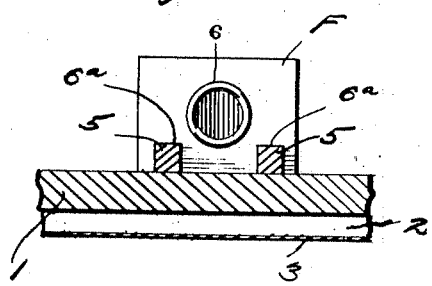
Inventor
Ray E. Cole

UNITED STATES PATENT OFFICE.

RAY E. COLE, OF CHICAGO HEIGHTS, ILLINOIS.

POCKET FLASH-LIGHT BATTERY AND BULB-TESTER.

1,315,816.  Specification of Letters Patent.  Patented Sept. 9, 1919.

Application filed July 3, 1918. Serial No. 243,186.

*To all whom it may concern:*

Be it known that I, RAY E. COLE, a citizen of the United States, residing at Chicago Heights, in the county of Cook and State of Illinois, have invented certain new and useful Improvements in Pocket Flash-Light Batteries and Bulb-Testers, of which the following is a specification.

This invention provides means whereby flash light batteries and bulbs may be tested without requiring adjustment or danger of breakage.

The invention provides an appliance which may be utilized for testing dry cells and batteries of like character and for determining the voltage of bulbs as also the voltage and amperage of dry cells and batteries.

The invention has for its object to provide an appliance of such construction whereby batteries and cells may likewise be tested thereby obviating the setting or adjusting of parts which is objectionable in a device of this character.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

In the drawing:—

Figure 1 is a front view of an appliance of the character stated, embodying the invention showing the circuits in diagram, Fig. 2 is a sectional detail on the line 2—2 of Fig. 1, the parts being enlarged, Fig. 3 is a horizontal section on the line 3—3 of Fig. 1 showing the parts on a larger scale, and Fig. 4 is a sectional detail on the line 4—4 of Fig. 1 the parts being enlarged.

Corresponding and like parts are referred to in the following description and indicated in the several views of the drawing by like reference characters.

The numeral 1 designates a board or suitable base upon which the several parts are mounted. A strip 2 projects rearwardly from the board to inclose a space in which the several connecting wires are located, such space being closed by means of a cover 3 applied to the circumscribing strip 2.

A plurality of bulbs are designated by the letters A, B, and C, the same being disposed at the upper end of the board or base 1. Suitable blocks are attached to the base 1 and are provided with lamp sockets to receive the bulbs A, B, and C. These blocks are indicated generally at E. The block E supporting the bulb A is provided with two contacts $a$, $a'$ which are electrically connected with the parts of the socket so as to include the bulb A in circuit when such bulb is in position. The contacts $a$, $a'$ are preferably disposed upon adjacent sides of the block. These elements constitute a tester for small batteries and cells which have the contacts at one end. When the battery or cell is presented so that its contacts make electrical connection with the contacts $a$, $a'$ the bulb A will become illuminated under normal conditions. A strip 4 projects outwardly from the lower edge of the base 1, and receives an expansible coil spring $a^2$ which constitutes a yieldable contact the same being electrically connected by means of a wire $a^3$ and a wire 12, lamp C and wire 13 with contact $a'$. It will thus be understood that a four cell battery may be tested by bringing the upper contact in engagement with the contact $a'$ and the lower contact in engagement with the contact $a^2$ thereby completing the circuit through the lamp C and causing the same to light under normal conditions.

The bulb B is mounted on a block E in a manner similar to the bulbs A and C. A block F is slidably mounted upon the base 1 and has two bars 5 attached thereto at their lower ends, the upper ends of the bars 5 operating in grooves $6^a$ formed in the rear side of the block E. In this manner the block F is retained in place and directed in its vertical movements. An expansible helical spring 6 is interposed between the blocks E and F and has its ends seated in sockets formed therein. The spring 6 normally presses the block F downward and admits of the same yielding vertically. Downward displacement of the block F is prevented by means of pins 7 passed through the upper ends of the bars 5. A contact $b$ is applied to the lower side of the block F, and is electrically connected with an element 8 on the rear side of the block F. A plate 9 is seated in the face of the base 1 and is connected by means of a wire with one contact of the bulb B. The plate 9 preferably consists of a spring so as to insure contact being maintained between the element 8 and the plate in all adjustments to the block F. A block 10 is mounted upon the strip 4 and carries a contact $b'$ which is electrically connected by means of a wire 11 with the other terminal of the bulb B. It will thus be understood that when a battery or cell is introduced between the blocks F and 10 with its poles in engagement with the contact $b$, $b'$ the bulb B will become lighted under normal conditions. Any variation in the distance between the terminals of different batteries or cells of the same size will be compensated for by the yielding of the block F as will be readily understood.

A block F is associated with the block E supporting the bulb C and the same is mounted in substantially the same manner as the block F hereinbefore described in detail, hence it is not deemed necessary to refer to the manner of mounting such block. This block F receives a contact $c$ which corresponds to the contact $b$ and which is connected with one contact of the bulb $c$ in substantially the same manner as the contact $b$ and for this reason a detailed description is not deemed essential. A contact $c'$ is mounted upon an end portion of the strip 4 and is connected by means of a wire 12 with the other pole or contact of the bulb C so that when a dry cell or battery is placed between the contacts $c$, $c'$ the bulb C will become lighted under normal conditions. The distance between the contacts $c$, $c'$ is greater than the distance between the contacts $b$, $b'$ thereby accommodating a battery cell of greater length. The parts associated with the bulbs B and C are substantially identical the only difference residing in the distance between the coöperating contacts.

For testing the voltage and amperage of a battery, cell, or bulb an ammeter D is provided and mounted upon the base 1 and is electrically connected by suitable leads with contacts $d$, $d'$ applied to an end portion of the strip 4. It will thus be understood that the strength of a bulb or battery may be readily determined by means of the ammeter upon bringing the poles or contacts of the battery or bulb in connection with the contacts $d$, $d'$.

A wire $d^3$ connects one pole of the ammeter D with the contact $d$. A wire $d^4$ connects the other pole of the ammeter with the contact $d'$. A wire 14 connects the wire $d^3$ with a terminal of the lamp socket A. A wire 15 connects the wire $d^4$ with the other terminal of the lamp socket A. Hence the voltage of different bulbs may be tested by fitting the same in the socket provided to receive the lamp A.

From the foregoing taken in connection with the accompanying drawing it will be understood that the invention provides an appliance whereby dry cells and batteries of various lengths may be conveniently and quickly tested so as to determine their condition and strength. It will also be understood that bulbs may be in a like manner tested since they may be quickly applied to the sockets mounted upon the several blocks E, it being understood that the bulbs and their coöperating sockets are of usual construction so as to admit of the bulbs being easily and quickly removed or placed in position.

Bulb A is usually 2.7 amperes, 3½ volts and used in connection with two cell batteries. Bulb C is 3.8 amperes, 4½ volts and is used with three or four cell batteries. To test a four cell battery the same is placed with its terminals in connection with the contacts $a'$ and $a^2$, the current passing through the lamp C in the manner stated.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. In a tester of the character specified, a relatively fixed bulb supporting member, a slidable member, a spring between the two members and normally pressing the slidable member outward, a spring plate electrically connected with the bulb, and a contact on the slidable member and maintaining electric connection with the plate at all adjustments of the slidable member.

2. In a tester of the character specified, a base, a fixed member on the base, a plate on the base, a bulb mounted on the member and in electric connection with the said plate, a slidable member, a contact on the slidable member and in electrical connection with the said plate, and a guide connected with the slidable member and retained in place by means of the said fixed member which constitutes a keeper therefor.

3. In a tester of the character specified, a base, a fixed member on the base, a bulb mounted upon the fixed member, a plate on the base and in electrical connection with the bulb, a slidable member, an expansible spring between the fixed and slidable members, a contact on the slidable member and in electrical connection with the said plate, elements attached to the slidable member and operable in openings formed in the fixed member whereby a slidable member is retained in place and directed in its movements, and means for eliminating the outward movement of the slidable member.

In testimony whereof I affix my signature in presence of two witnesses.

RAY E. COLE.

Witnesses:
GEO. W. COEMAN,
JOHN MICHAHT.